United States Patent
Muehlfeld et al.

(10) Patent No.: US 10,685,228 B2
(45) Date of Patent: Jun. 16, 2020

(54) MULTIPLE DAY MAPPING INDEX AGGREGATION AND COMPARISON

(71) Applicant: Sentera, Inc., Minneapolis, MN (US)

(72) Inventors: Andrew Muehlfeld, Minneapolis, MN (US); Justin Hui, Minneapolis, MN (US); Reid Plumbo, Minneapolis, MN (US); Joe Tinguely, Minneapolis, MN (US)

(73) Assignee: Sentera, Inc., Minneapolis, MN (US)

( * ) Notice: Subject to any disclaimer, the term of this patent is extended or adjusted under 35 U.S.C. 154(b) by 307 days.

(21) Appl. No.: 15/870,554

(22) Filed: Jan. 12, 2018

(65) Prior Publication Data

US 2018/0196987 A1 Jul. 12, 2018

Related U.S. Application Data

(60) Provisional application No. 62/445,533, filed on Jan. 12, 2017.

(51) Int. Cl.
*G06K 9/00* (2006.01)
*H04N 1/407* (2006.01)
(Continued)

(52) U.S. Cl.
CPC ......... *G06K 9/0063* (2013.01); *G06K 9/4647* (2013.01); *G06K 9/6212* (2013.01);
(Continued)

(58) Field of Classification Search
CPC ...... G06K 9/4647; G06K 9/6212; G06T 5/40; H04N 1/4074; H04N 1/6063
See application file for complete search history.

(56) References Cited

U.S. PATENT DOCUMENTS

| | | | |
|---|---|---|---|
| 2008/0219505 A1* | 9/2008 | Morimitsu | G06K 9/00201 382/103 |
| 2009/0083291 A1* | 3/2009 | Allen | G06T 5/005 |

(Continued)

OTHER PUBLICATIONS

You et al, "Efficient Histogramming of Large-Scale Geospatial Rasters in Supporting of Web-Based Queries", ACM, Nov. 2011, pp. 44-45 (Year: 2011).*

*Primary Examiner* — Edward Park
(74) *Attorney, Agent, or Firm* — Hamre, Schumann, Mueller & Larson, P.C.

(57) ABSTRACT

Index-based geospatial analysis may include applying a first and second index-based analysis for a set of imagery. The set of imagery may include a location-specific index values used to form a histogram for a single index image (e.g., for a single surveyed field). This first analysis may be referred to as an "acre-to-acre" mapping, which may be useful for identifying differences in indices (e.g., NDVI vegetative health) of different parts of the field from a single day. A second "day-to-day" index-based analysis may be performed by calculating a histogram for each set of imagery from multiple days, combining the histograms, and generating a single equal-area index map. The index map can be applied to redistribute the histogram values within multiple days of data, which may provide a more useful map of variation in each individual image and changes between images.

11 Claims, 11 Drawing Sheets
(9 of 11 Drawing Sheet(s) Filed in Color)

(51) Int. Cl.
  *G06T 5/40* (2006.01)
  *G06K 9/46* (2006.01)
  *G06K 9/62* (2006.01)
  *H04N 1/60* (2006.01)

(52) U.S. Cl.
  CPC ............ *G06T 5/40* (2013.01); *H04N 1/4074* (2013.01); *H04N 1/6063* (2013.01)

(56) References Cited

U.S. PATENT DOCUMENTS

| | | | | |
|---|---|---|---|---|
| 2010/0145979 | A1* | 6/2010 | Barnett | G06F 16/29 |
| | | | | 707/769 |
| 2012/0226889 | A1* | 9/2012 | Merriman | G06F 16/2264 |
| | | | | 711/216 |
| 2013/0148883 | A1* | 6/2013 | Lee | G06K 9/3241 |
| | | | | 382/165 |
| 2015/0081619 | A1* | 3/2015 | Brown | G06F 16/254 |
| | | | | 707/602 |
| 2016/0203189 | A1* | 7/2016 | Benum | G06F 16/256 |
| | | | | 707/722 |
| 2017/0329569 | A1* | 11/2017 | Wilczynski | G06F 3/1454 |
| 2018/0196987 | A1* | 7/2018 | Muehlfeld | G06K 9/6212 |

\* cited by examiner

MULTIPLE DAY MAPPING INDEX AGGREGATION AND COMPARISON

CLAIM OF PRIORITY

This patent application claims the benefit of priority to U.S. Provisional Patent Application Ser. No. 62/445,533, filed Jan. 12, 2017, which is hereby incorporated by reference herein in its entirety.

TECHNICAL FIELD

Embodiments described herein generally relate to mapping imagery.

BACKGROUND

When performing geospatial analysis, data analysts often use various indices to provide an analytic or graphical analysis framework. One example of the use of indices occurs within precision agriculture. A Normalized Difference Vegetation Index (NDVI) may be used to represent healthy vegetation, where each NDVI data point includes a value between −1.0 (i.e., no vegetation) and +1.0 (i.e., healthy vegetation). However, data for many indices are concentrated within a narrow range. For example, NDVI values for a given agricultural field are often concentrated within the range of 0.7 to 0.8. What is needed is an improved analysis framework for index-based geospatial analysis.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

DESCRIPTION OF EMBODIMENTS

Figure 1A:
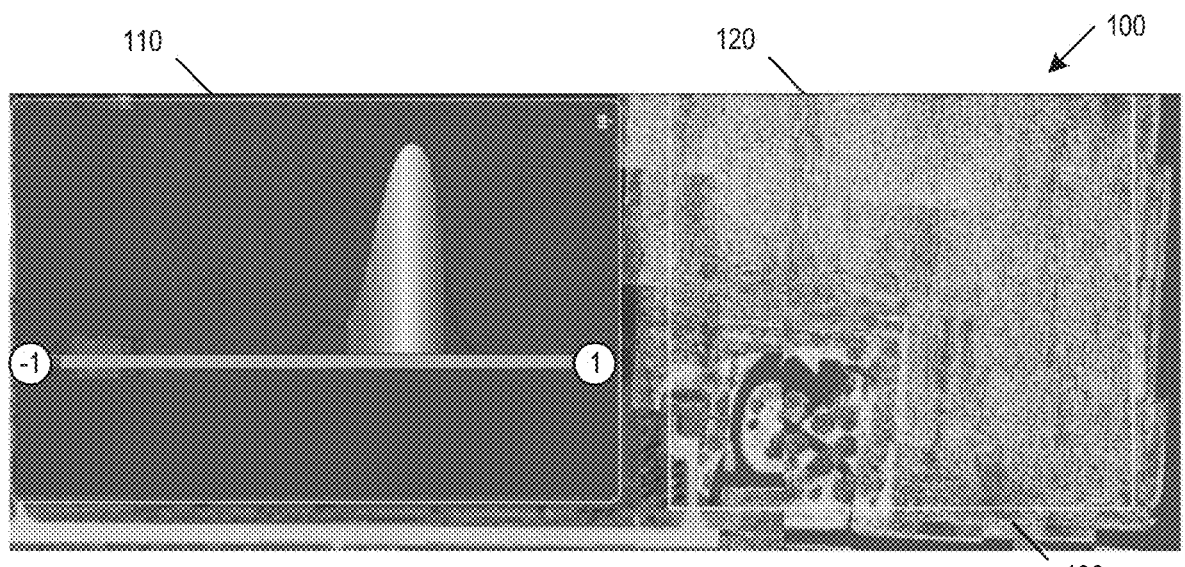
FIGS. 1A-1C are graphs of acre-to-acre index mapping 100, in accordance with at least one embodiment.

The present subject matter provides a technical solution for various technical problems associated with index-based geospatial analysis. A first index-based analysis may be performed for each set of imagery, such as a set of location-specific index values used to form a histogram for a single index image (e.g., for a single surveyed field). This first analysis may be referred to as an "acre-to-acre" mapping. Acre-to-acre view may be useful for identifying differences in indices (e.g., NDVI vegetative health) of different parts of the field from a single day, because it uses the full range of colors for that single survey. In other words, it highlights the change from one acre to another, or the acre-to-acre change.

A second index-based analysis may be performed by calculating a histogram for the imagery from multiple days, combining the histograms, and generating a single equal-area index map. This second analysis may be referred to as a "day-to-day." While this day-to-day analysis provides a useful comparison between two data sets captured on different days, this analysis may also be performed on two data sets captured on the same day. The index map can be applied to redistribute the histogram values within multiple days of data, which can be used to provide a more useful map of variation in each individual image and changes between images. A data set may include an original set of multiple images or may include a single image, such as a mosaic image that was stitched (e.g., assembled) from multiple images. The day-to-day algorithm applies whether using a single source image, a single mosaic generated from multiple source images, or the multiple source images themselves.

Day-to-day view may be useful for monitoring the progress of particular areas of the field and the field as a whole, between different days, because each color corresponds to the same NDVI value for all surveys collected on all days. In other words, it highlights the change from one day to another, the day-to-day change.

Each of the histograms may include a color scale (e.g., red, orange, yellow, green, blue), a greyscale scale, multiple different hash mark patterns, or other patterns to represent different index values within the histogram. The figures used within this patent application will include greyscale values, but may be described with respect to a color scale. The type of visual indicator selected to represent various index values may improve a user's ability to distinguish between values, however the graphical representation (e.g., colors, greyscale shades, patterns) are visual representations of the underlying algorithm, and do not alter the indexing algorithm itself. For example, it may be beneficial to increase the number of visual representations within the histogram used when applying the day-to-day analysis, as this could show variation within each individual image, while still showing index changes between dates.

While the systems and methods used within this patent application are described with respect to NDVI-based agricultural analysis, these index-based analysis techniques are applicable to other areas, including military, urban development studies, forestry, and any other field that uses remote sensing. This method can be applied to any remote sensing index. Some indices are shown as a monochrome image, where each pixel has a numeric value. These monochromatic indices differ from traditional imagery in that traditional imagery has three values per pixel: red, green, and blue, while an index is often represented as a single value per pixel computed from multiple bands. Indices may be computed using a formula combing values from different bands, such as NDVI. Indices may also be determined with other algorithms based on single pixel or multiple pixel analysis, such as Leaf Area Index. Leaf Angle Distribution, Canopy Coverage Fraction, Biomass, Plant Height, Disease Effect Fraction, Pest Presence Fraction, Weed Presence Score, Nutrient Deficiency Score, Nitrogen Deficiency Score, and other indices. NDVI is a common index used in agriculture analysis, and NDVI will be used as an example throughout this application. However, the systems and methods described herein can be applied to any index, such as Atmospherically Resistant Vegetation Index (ARVI). Visible Atmospherically Resistant Index (VARI), Enhanced Normalized Difference Vegetation Index (ENDVI). Soil-Adjusted Vegetation Index (SAVI), Optimized Soil Adjusted Vegetation Index (OSAVI), Renormalized Difference Vegetation Index (RDVI), or other indices. Additionally, while the systems and methods used within this patent application are described with respect to images, other encoded geographical information file formats may be used, such as vector graphics (e.g., GIS Shapefile), raster graphics, grid formats, or other encoded geographical file formats.

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

Figure 1B:
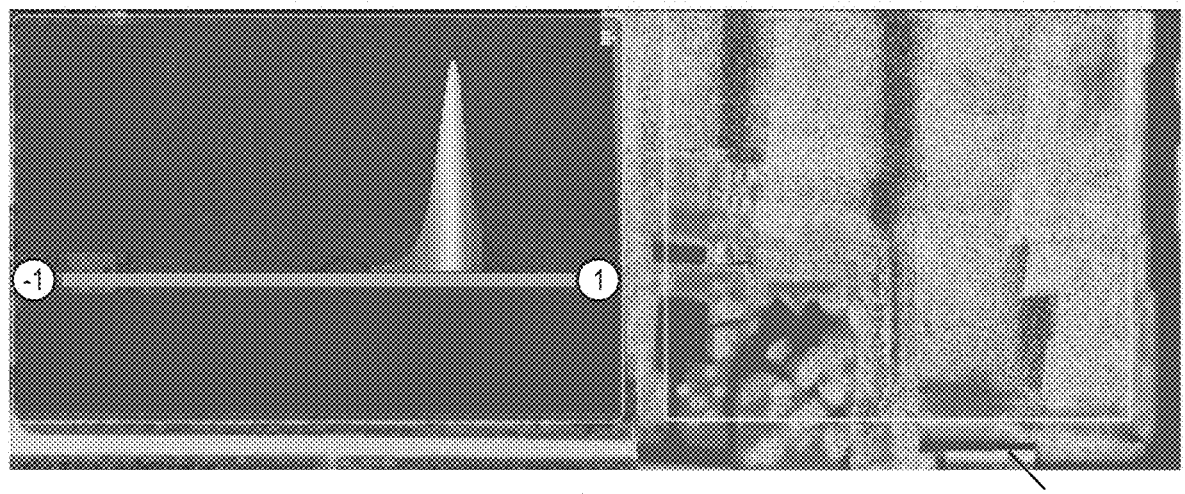
Figure 1C:
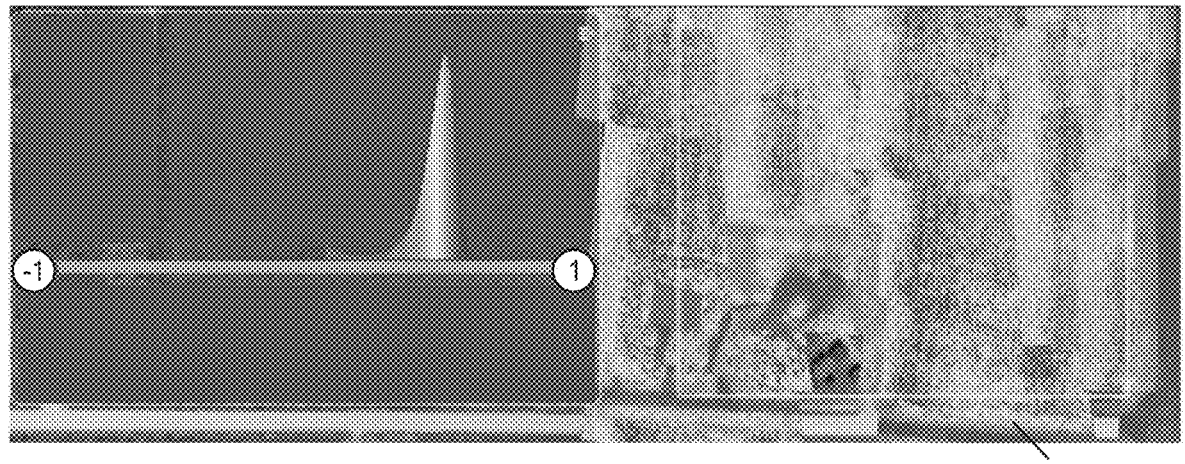

FIGS. 1A-1C are graphs of acre-to-acre index mapping 100, in accordance with at least one embodiment. Example graphs each include a histogram 110 and an image of a field 120. The histogram 10 provides a visual representation (e.g., color spectrum, greyscale shade, hash mark pattern) as assigned to the index values between −1 and +1. Because the index values may include any fractional or decimal value between −1 and +1, the visual representation may group the index values into index subgroups (e.g., index subgroup ranges, index bins). In an example, the index values may be divided into 256 index bins between −1 and +1, and each index bin may be assigned an associated color value on the visible color spectrum. Different indices may have various associated minimum values, maximum values, or index subgroup ranges. For example, NDVI includes a range between −1 and +1, canopy coverage fraction includes a range between 0 and 1 (e.g., 0% to 100%), plant height includes a minimum of 0 inches and no defined maximum plant height, and leaf area index includes a minimum of 0 leaves and no defined maximum number of leaves. The histogram 110 also shows an approximate distribution of the index values, which may include one or more peaks showing a high concentration of index values. The image of a field 120 may include a captured field image or a representative image (e.g., line drawing) of the field. The image of the field 120 is overlaid with colors (e.g., greyscale shades, hash mark patterns) corresponding to the histogram 110. In an example, each pixel within the image of the field 120 shows the corresponding index value, which may be referred to as a "mosaicked" image.

In selecting the colors or other representations within the histogram 110, an equal area color map may be used. In an example, four index bins may be used, where the histogram 110 and field 120 are comprised of 25% red, 25% orange, 25% yellow, and 25% green. This approach may be applied to a single image, or applied to a set of imagery from a single day. However, it is common to collect data at different times throughout the growing season to monitor the progress of a field, and different images may result in different histograms. These differences between images may make it difficult to visualize the change over time within the selected index. For example, applying equal area color mapping may result in the mosaicked image of a field looking very similar, as the healthiest 25% is probably still the healthiest 25%.

Figure 2A:
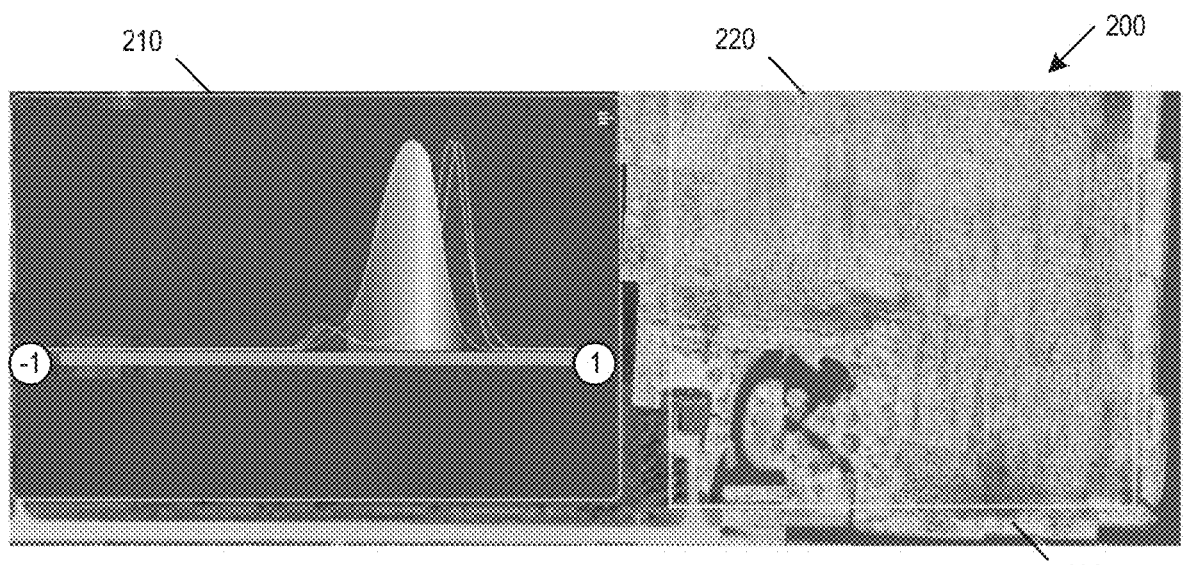
FIGS. 2A-2C are graphs of day-to-day index mapping 200, in accordance with at least one embodiment.
Figure 2B:
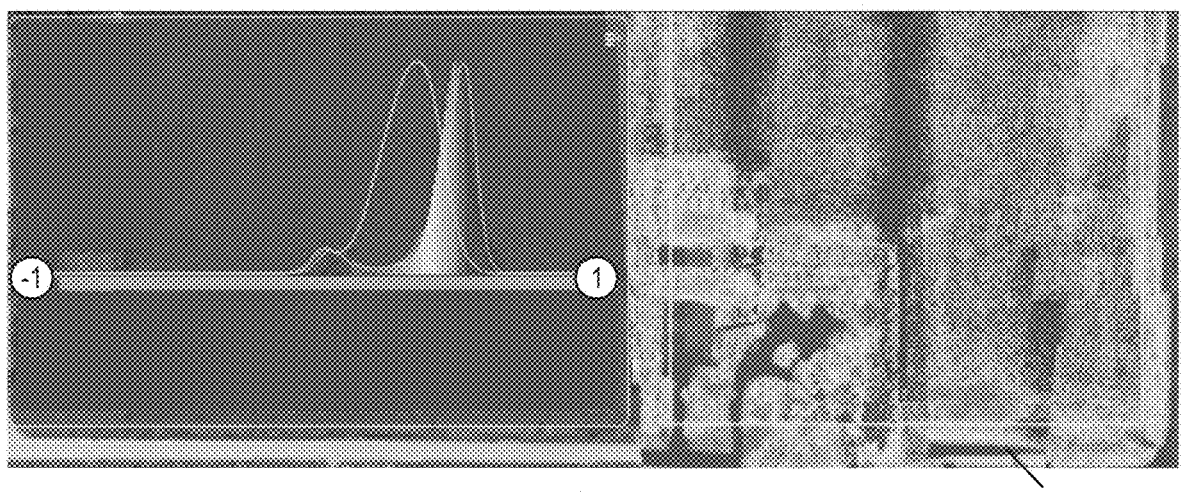
Figure 2C:
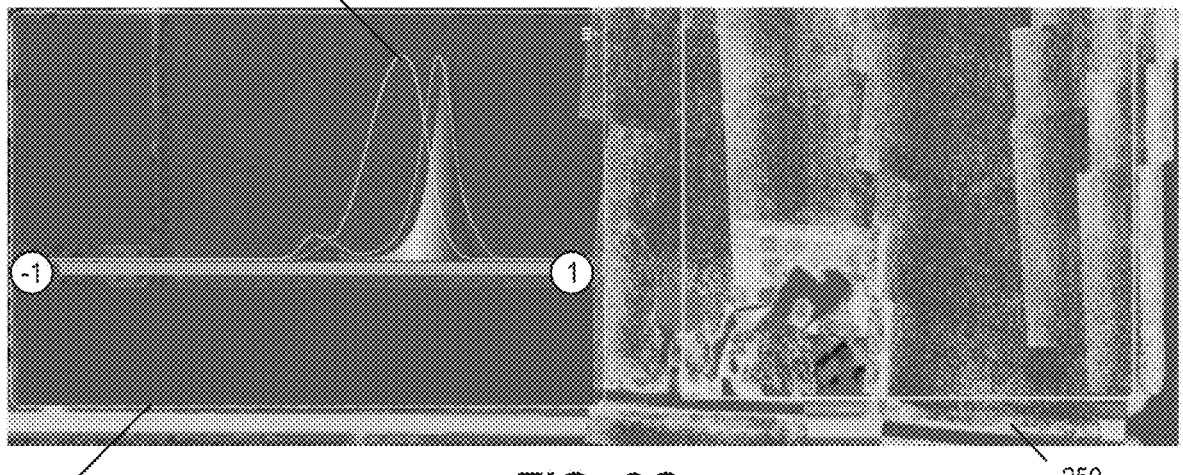

The differences in the acre-to-acre views can be seen in FIGS. 1A-1C. FIG. 1A shows example NDVI values from June 15 of one year, FIG. 1B shows NDVI values for the same field for June 28, and FIG. 1C shows NDVI values for the same field for July 14. FIGS. 1A-1C show a lower NDVI area 130, 140, and 150. This area, referred to as a drown-out area, shows the lowest biomass on both FIG. 1A (June 15) and FIG. 1B (June 28). As shown in FIG. 1C, the variation within a single flight enables the viewer to see that the drown out area 150 is lagging the surrounding areas FIGS. 2A-2C are graphs of day-to-day index mapping 200, in accordance with at least one embodiment. In day-to-day mapping 200, the NDVI value is calculated for every pixel of one survey (e.g., one flight, one field, one day) to produce statistics for that survey. This process is repeated for each survey, generating a single, independent set of statistics for each survey. The statistics files are then combined, not by number of pixels, but by percent of pixels per survey. For example, if one survey is flown at 200 ft. and another is flown at 400 ft., the higher survey may have only the number of pixels of the lower survey. Both surveys may be weighted equally, so statistics sets are combined by percent of total pixels within a single survey, rather than absolute number of pixels. An output map may be produced such that if all surveys were displayed side-by-side, each color, and its corresponding range of NDVI values, would appear in equal amounts. This day-to-day mapping provides various advantages. For example, day-to-day mapping provides consistent quantitative meaning of the colors when comparing multiple images, while still providing useful color variation while viewing a single image.

Three such surveys are displayed side-by-side in FIGS. 1A-1C. For example, in contrast with the FIG. 1A histogram 110 that includes colors in equal amounts, the FIG. 2A histogram 210 includes colors in unequal amounts. In an example, a first survey may include 50% red, 25% orange, 25% yellow, and 0% green, whereas a second survey may be 0% red, 25% orange, 25% yellow, and 50% green. However, when all surveys are analyzed together, the combination of all FIGS. 2A-2C includes colors in equal amounts. This improves the ability of a user to distinguish between multiple days. In an example, FIG. 1A corresponds to a histogram and field on June 15, FIG. 1B corresponds to a histogram and field on June 28, and FIG. 1C corresponds to a histogram and field on July 14. The day-to-day views shows that while most of the field has progressed significantly from June 15 to June 28, the area of drown out 230, 240 has made little or no progress. However, the drown out area 240 shows progress relative to the same area 250 on July 14, though the index values are still not quite as high as the surrounding area.

Additional graphical analysis features may be used. For example, an outline 260 may be used to show one or more peaks from other histograms, which may be used to view the progression of the peak. In an example, outline 260 shows an initial peak from FIG. 1A, which shows that the current peak in FIG. 1C has a concentration of higher NDVI values (e.g., improved vegetation). Additional graphical user interface (GUI) options 270 may be used, such as providing the ability to select among various scale types, color maps, or other statistics. Additional GUI options may include the ability to select which dates are included in that day-to-day calculation, the ability to hover over various portions of the histogram 210 or map 220 and be shown values (e.g., minimum and maximum NDVI values for that color, average NDVI values, acreage for a given NDVI value), providing the ability to recalibrate the minimum or maximum NDVI values, or other GUI features.

Figure 3:
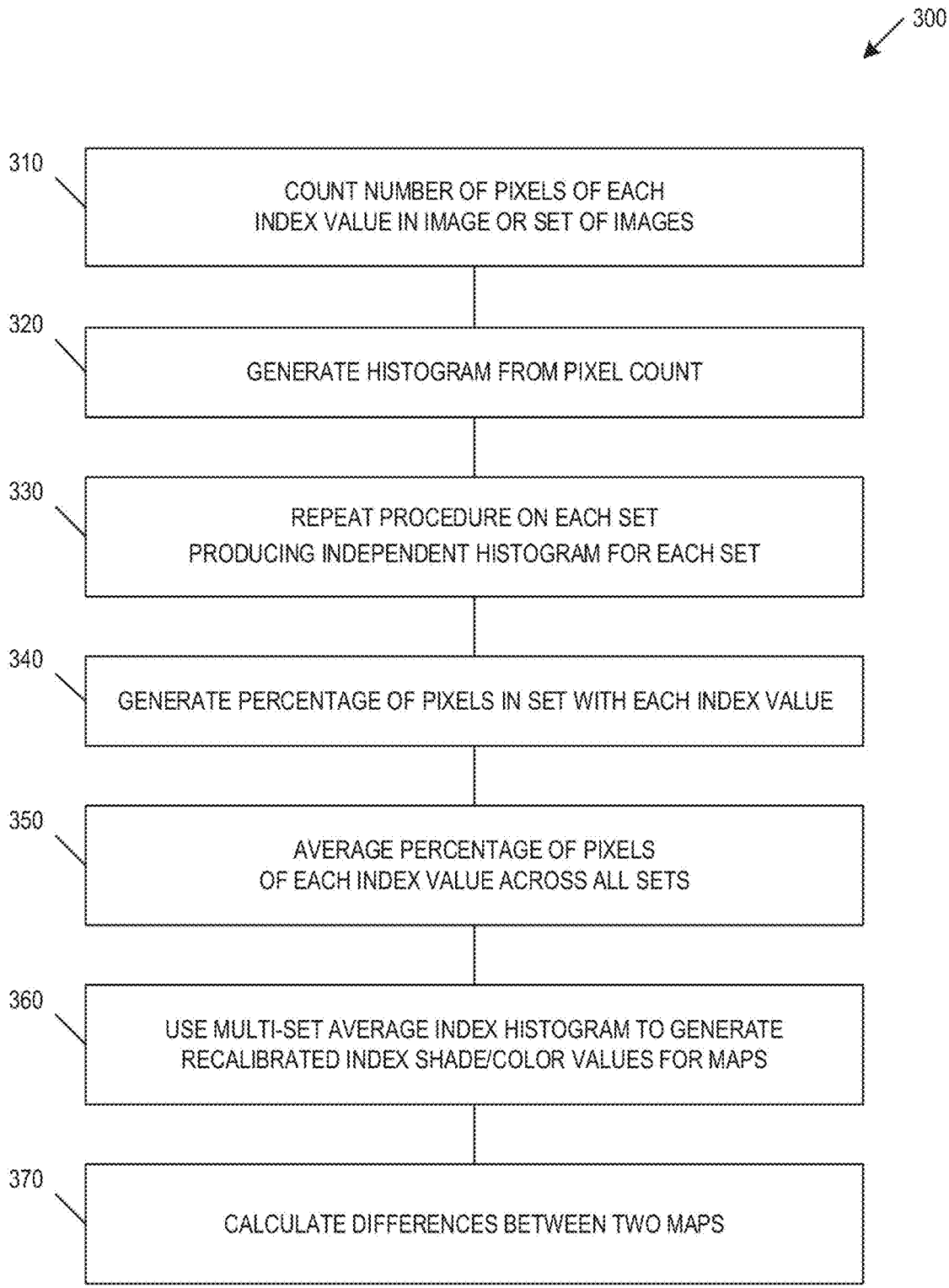
FIG. 3 is a block diagram of a day-to-day index method 300, in accordance with at least one embodiment.

FIG. 3 is a block diagram of a day-to-day index method 300, in accordance with at least one embodiment. Method 300 includes counting 310 pixels of each index value (e.g., NDVI value) in an image or set of images, such as from a single index survey flight on a single day. Method 300 includes generating 320 a histogram from that pixel count. This histogram may be used to provide an acre-to-acre comparison, such as shown in FIGS. 1A-1C.

Method 300 includes repeating the procedures 330 on each data set, producing an independent histogram for each data set. Method 300 includes generating 340 a percentage of pixels in the set corresponding to each index value, such as by dividing the pixel count of each index value by the total number of pixels in the set (i.e., images from one flight or one survey or one day). Depending on the number of index values within the data sets, there may be a different number of pixels because of a different number of data sets. Method 300 includes taking the average 350 of the percentages of pixels of each index value across all sets. Method 300 includes using the multi-set average index histogram to generate 360 a color map for use on all individual sets. Various greyscale or color data clustering (e.g., histogram generation) algorithms may be used, such as an equal area classification method, the Jenks natural breaks classification method, or other data clustering algorithm. This may produce the day-to-day comparison, such as shown in FIGS. 2A-2C. Method 300 may optionally include calculating 370 a difference of index values between two sets. For example, NDVI values from a second data set may be subtracted from NDVI values from a first data set. For NDVI values, the resulting difference would include values between −2 and +2. The higher difference values indicate rapid growth, lower values indicate little growth, and negative values indicate negative growth (i.e., vegetative regression).

Variations of method 300 may be used to provide various comparisons for data of varying sizes. For example, a first data set may include 50 pixels, such as shown in Table 1 below:

TABLE 1

First Individual Histogram

| Value | Number of Pixels | % of Pixels |
|---|---|---|
| 0 | 10 | 20% |
| 1 | 40 | 80% |

A second data set may include 200 pixels, distributed as shown in Table 2 below:

TABLE 2

Second Individual Histogram

| Value | Number of Pixels | % of Pixels |
|---|---|---|
| 0 | 190 | 95% |
| 1 | 10 | 5% |

Method 300 may provide a useful comparison between these two dissimilar data sets, such as shown in Table 3 below:

TABLE 3

Aggregate Histograms

| Value | Average of Total Number of Pixels | Average % of Pixels |
|---|---|---|
| 0 | (10 + 190)/(10 + 190 + 40 + 10) = 80% | (20 + 95)/2 = 57.5% |
| 1 | (40 + 10)/(10 + 190 + 40 + 10) = 20% | (80 + 5)/2 = 42.5% |

Table 1 and Table 2 show possible variations between the first individual histogram and a second individual histogram, respectively. Table 1 shows a first individual histogram with 50 total pixels, where 20% of the pixels include a 0 value. In contrast, Table 2 shows the second individual histogram with 200 total pixels, where 95% of the pixels include a 0 value. The aggregation of the data from Tables 1 and 2 are shown in Table 3, where Table 3 contrasts the aggregation of index values based on numbers of pixels or percentages of pixels. When analysis is performed on pixels alone, the 80% of the pixels correspond to an index value of 0, and 20% of the pixels correspond to an index value of 1. In contrast, when analysis is performed based on average percentages of pixels, the 57.5% of the pixels correspond to an index value of 0, and 42.5% of the pixels correspond to an index value of 1. There are different instances in which each calculation may be preferred. For example, when two different sets of NDVI values are obtained for the same geographic area but using different numbers of pixels, then the use of the average percentage of pixels may provide a more accurate representation of the NDVI values for that geographic area. In contrast, when a consistent image resolution is used (e.g., pixels per inch) and two different sets of NDVI values are obtained for a small area and a much larger area, then the use of the average of total number of pixels may provide a more accurate representation of the NDVI values for all of the areas. In addition, when the number of pixels is the same or similar between multiple data sets, computing the aggregate histogram by numbers of pixels or percentages of pixels may produce similar results. Other factors in selection of the aggregation analysis may be used, such as computational complexity. Other statistical analysis tools may be used, such as applying a weighted average to combine both the use of the average percentage of pixels and the use of the average of total number of pixels.

Figure 4A:
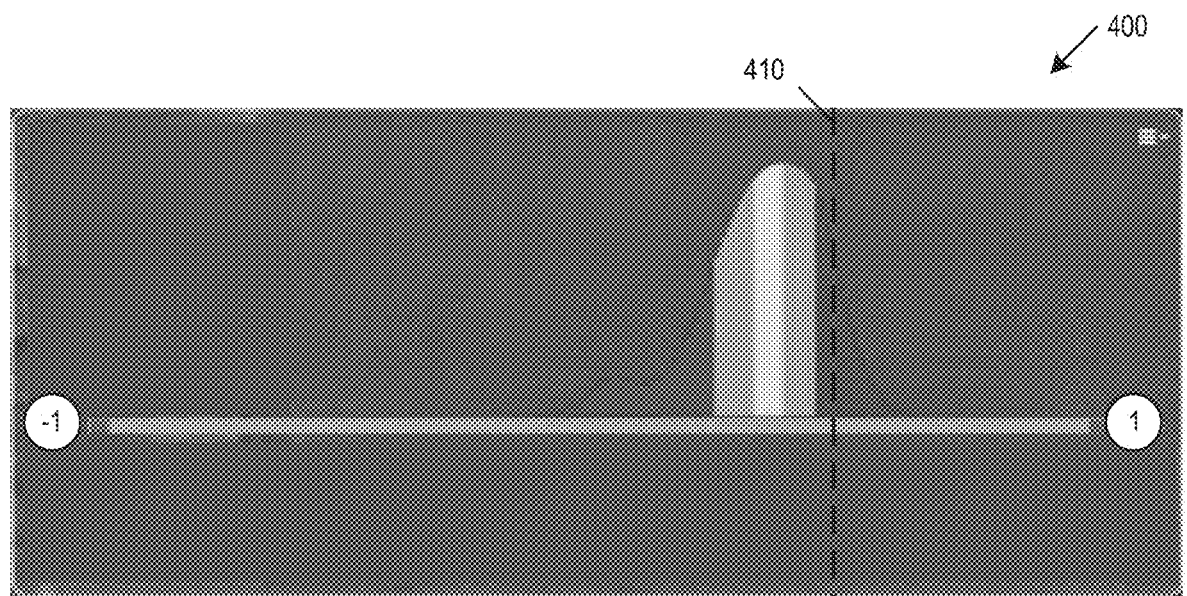
FIGS. 4A-4C are graphs of acre-to-acre histograms 400, in accordance with at least one embodiment.
Figure 4B:
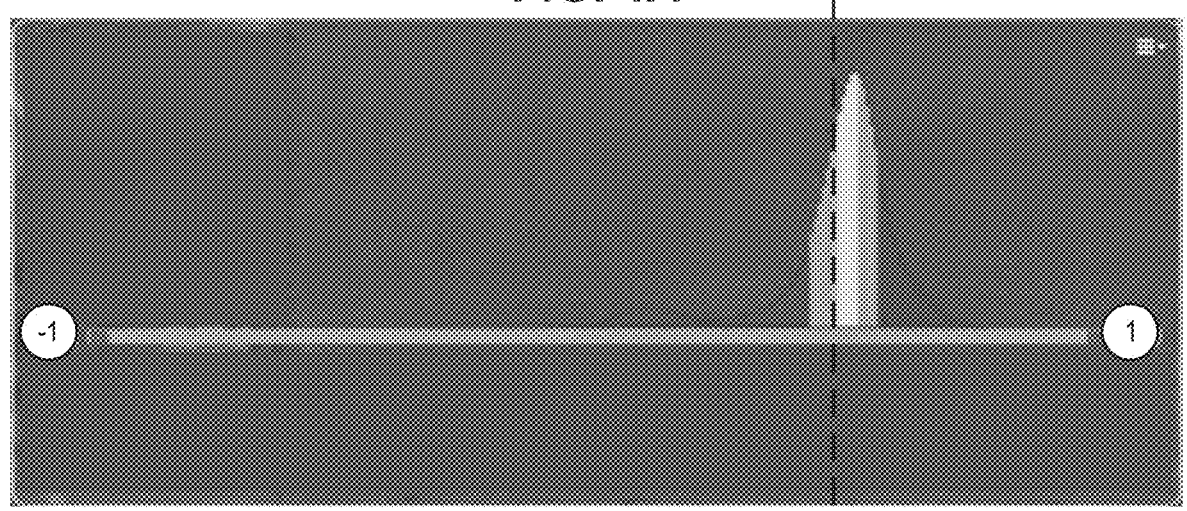
Figure 4C:
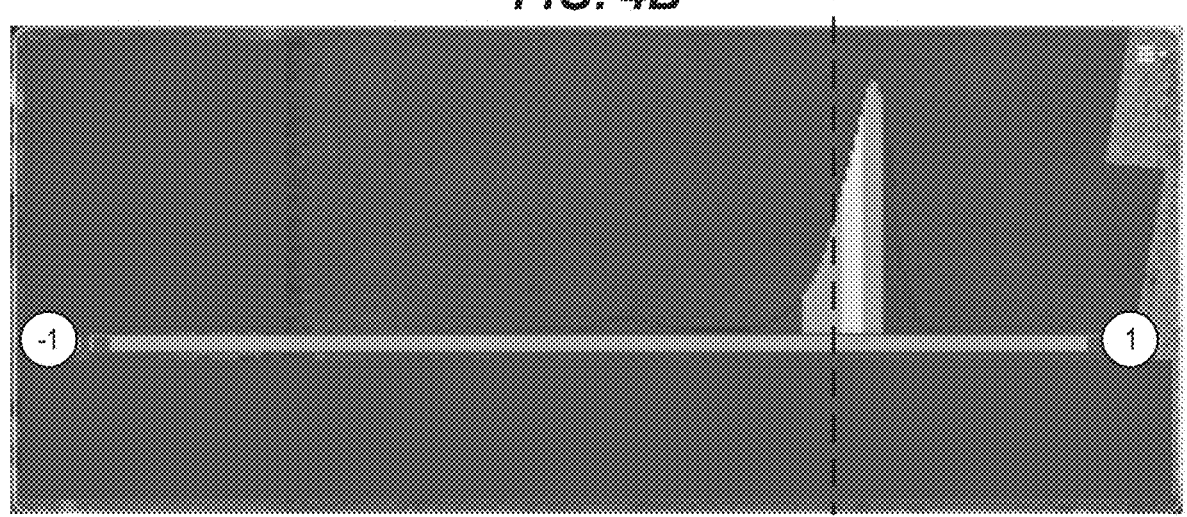

FIGS. 4A-4C are graphs of acre-to-acre histograms 400, in accordance with at least one embodiment. Within FIGS. 4A-4C, each survey has its own color mapping. The color mapping is calculated so there is the same amount of each color in the field. Since NDVI values change throughout the season, different surveys will have a different color mapping. As shown by vertical comparison line 410, an NDVI value that falls within the bin corresponding to the highest NDVI values in FIG. 4A may fall within one of the lowest NDVI value bins in FIG. 4B and FIG. 4C. This difference between acre-to-acre histograms 400 shows that a viewer may observe differences within a particular field, but the same color differences cannot be compared between or among two or more surveys.

Figure 5A:
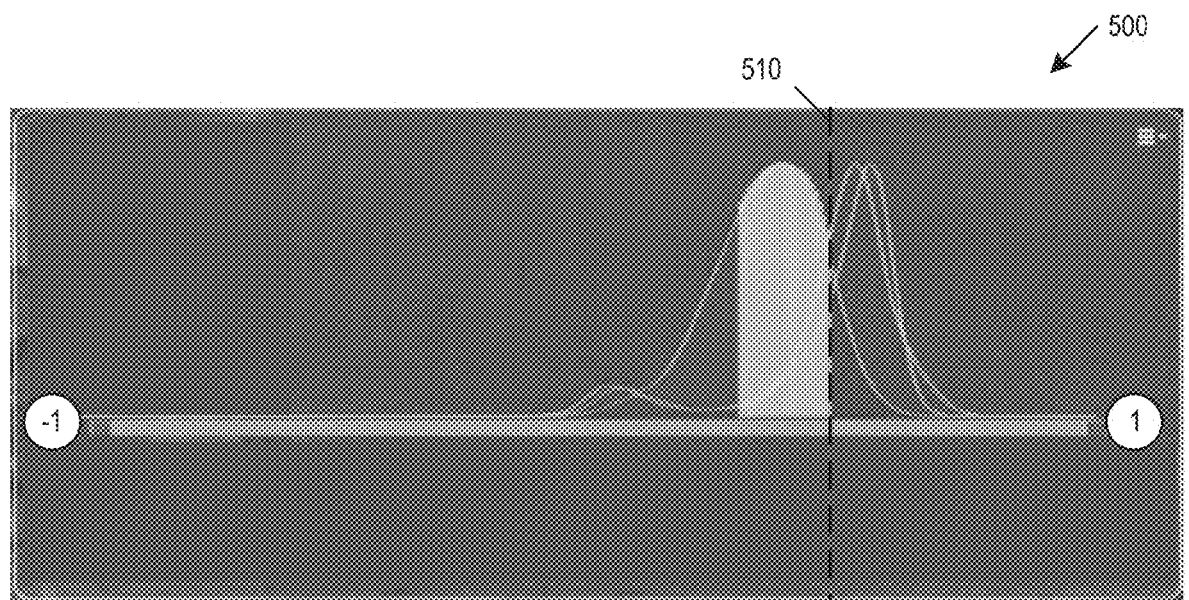
FIGS. 5A-5C are graphs of day-to-day histograms 500, in accordance with at least one embodiment.
Figure 5B:
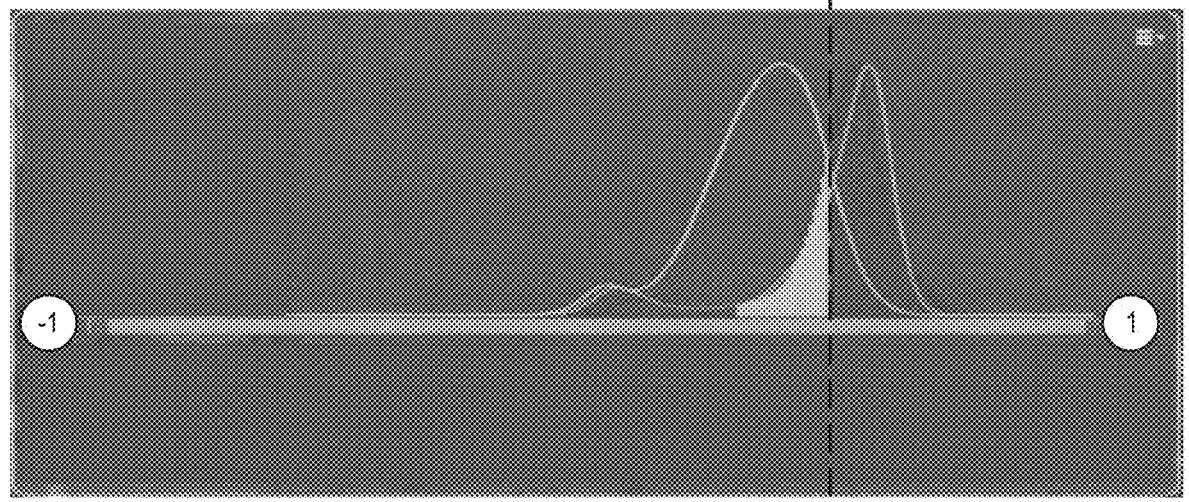
Figure 5C:
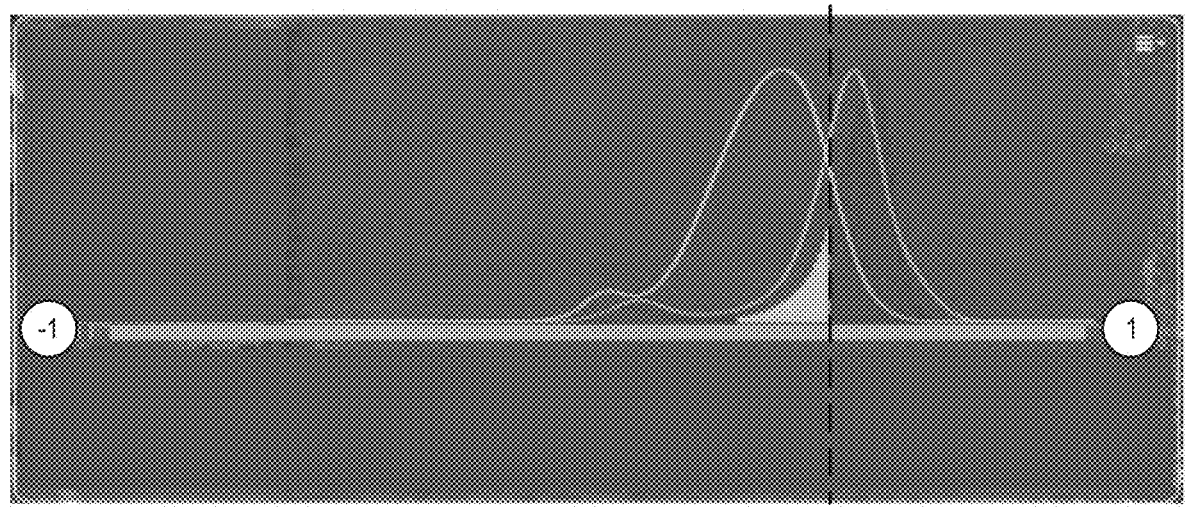

FIGS. 5A-5C are graphs of day-to-day histograms 500, in accordance with at least one embodiment. The use of the day-to-day analysis provides a color mapping that is consistent across day-to-day histograms 500. The color mapping is calculated so that the same amount of each color is used across all surveys. As a result, surveys early in the season will tend to include a disproportionately greater amount of lower NDVI values (e.g., red), and surveys toward the end of the season will tend to include a disproportionately greater amount of higher NDVI values (e.g., green). As shown by vertical comparison line 510, an NDVI value that defines the border corresponding to the highest NDVI values in FIG. 5A will correspond to the same NDVI value border within FIG. 5B and FIG. 5C. These day-to-day histograms 500 use a consistent color scale for different surveys, providing increased accuracy in monitoring the progress of a field.

Figure 6A:
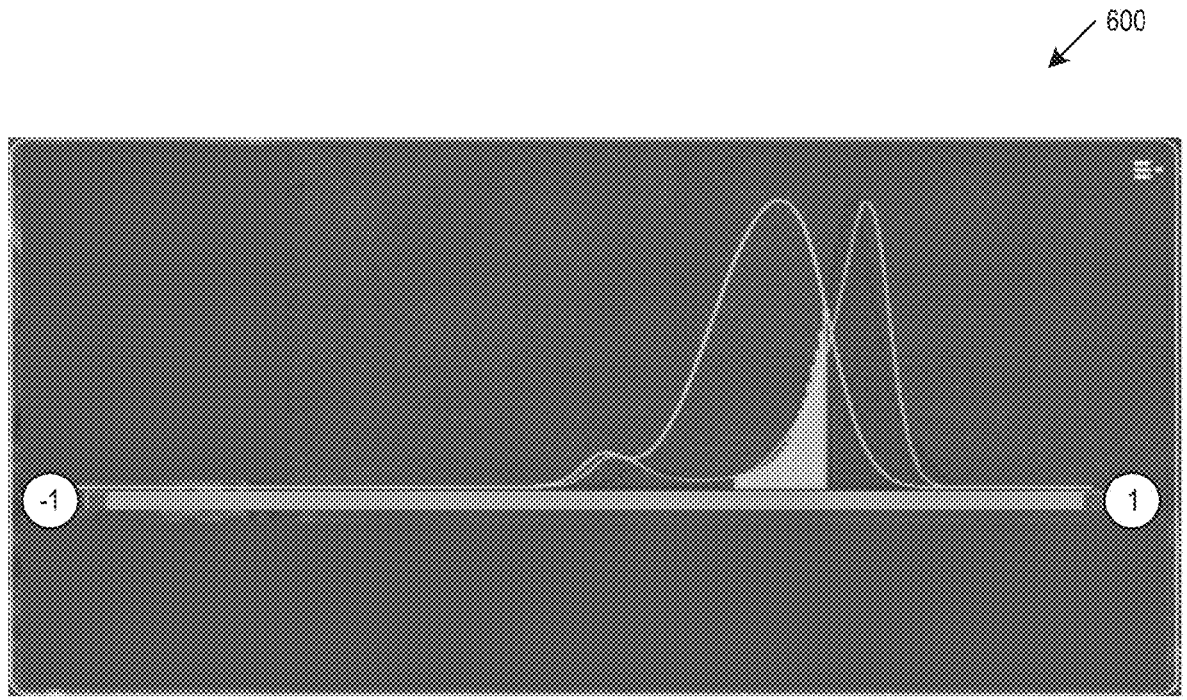
FIGS. 6A-6B are graphs of day-to-day bin comparison histograms 600, in accordance with at least one embodiment.
Figure 6B:
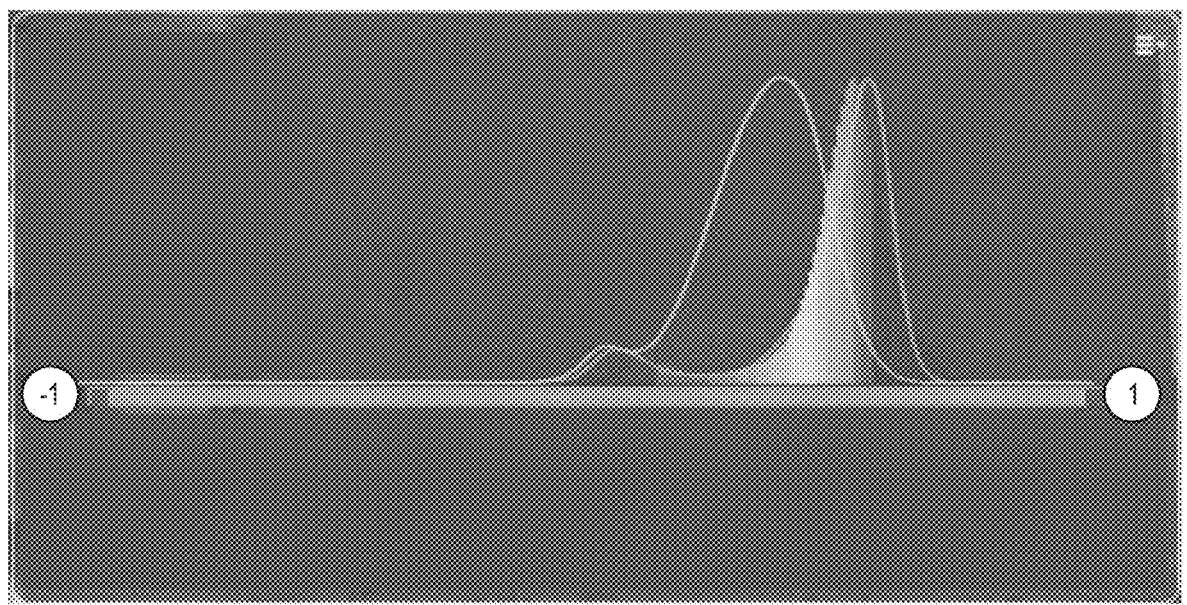

FIGS. 6A-6B are graphs of day-to-day bin comparison histograms 600, in accordance with at least one embodiment. FIG. 6A shows a day-to-day view that includes 5 bins (e.g., 5 colors, 5 shades). When using a small number of bins, the day-to-day view shown in FIG. 6A may show a large portion of the field as a single color. In contrast. FIG. 6B shows the same day-to-day view that includes 15 bins. This provides an increased ability to distinguish colors or shades between different NDVI values.

Figure 7A:
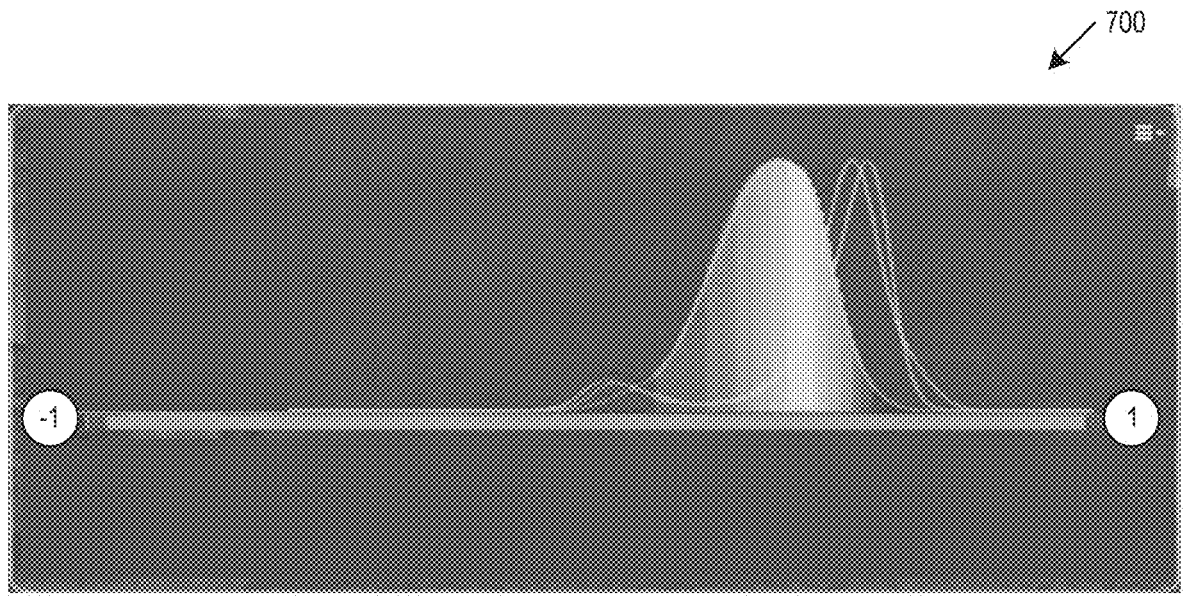
FIGS. 7A-7C are graphs of day-to-day increased bin histograms 700, in accordance with at least one embodiment.
Figure 7B:
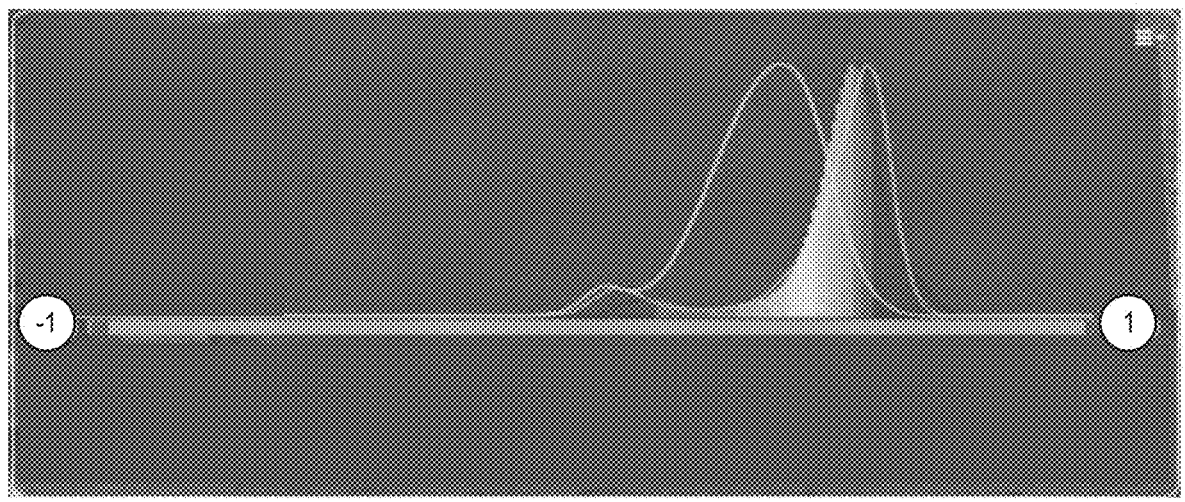
Figure 7C:
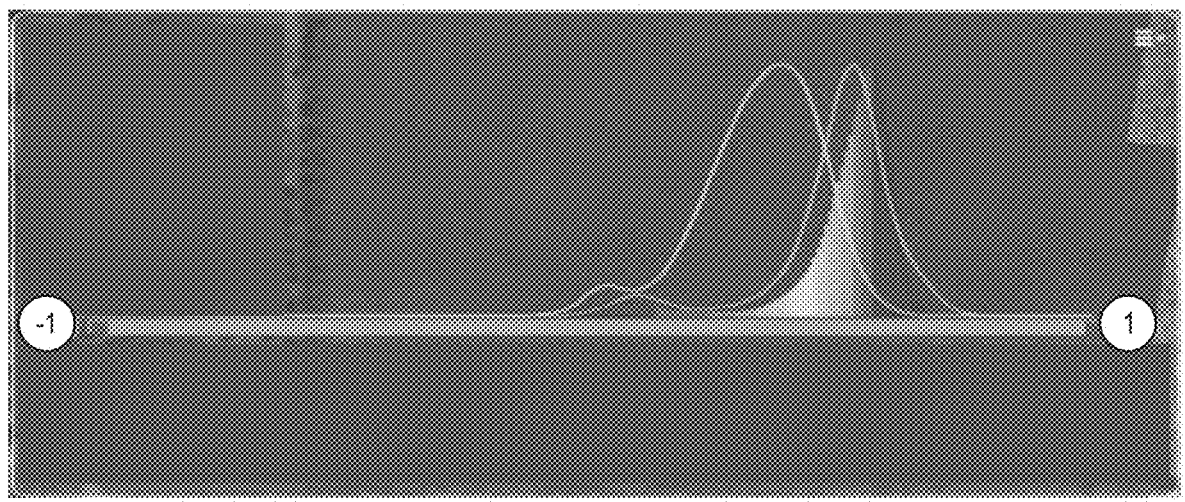

FIGS. 7A-7C are graphs of day-to-day increased bin histograms 700, in accordance with at least one embodiment. FIGS. 7A-7C show a 15-bin representation of the day-to-day view. This may be compared to the same surveys as shown in FIGS. 5A-5C, which show a 5-bin representation. Again, the 15 bin values are distributed across the three histograms 700 in FIGS. 7A-7C, where the use of 15 bins enables distinguishing between neighboring values within each figure.

Figure 8A:
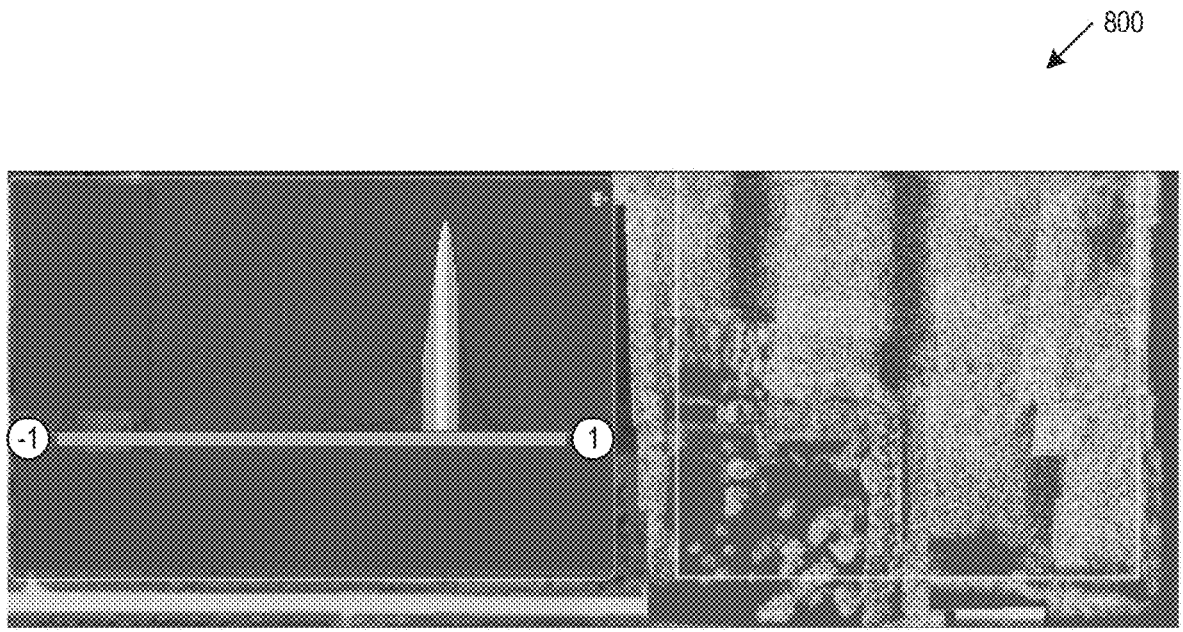
FIGS. 8A-8B are graphs of acre-to-acre increased bin histograms 800, in accordance with at least one embodiment.
Figure 8B:
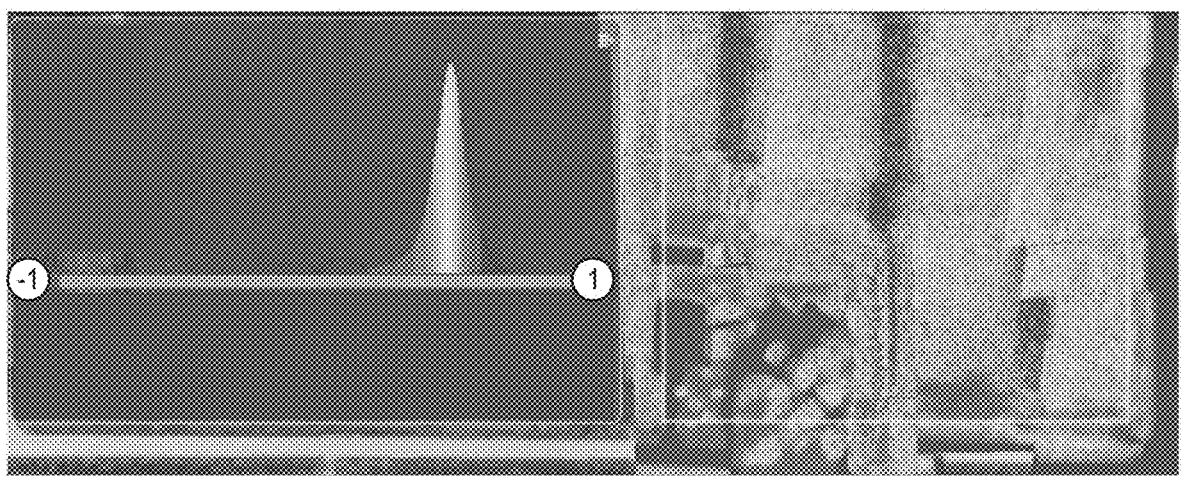

FIGS. 8A-8B are graphs of acre-to-acre increased bin histograms 800, in accordance with at least one embodiment. While increasing the number of bins in the day-to-day representations provides additional visual information for a user, a limited amount of additional visual information is provided for the acre-to-acre views. For example, FIG. 8A shows a 5-bin representation, which is visually similar to the 15-bin representation shown in FIG. 8B. However, some additional visual details may still be provided by increasing the number of bins for acre-to-acre analysis, such as shown in FIGS. 9A-9B.

Figure 9A:
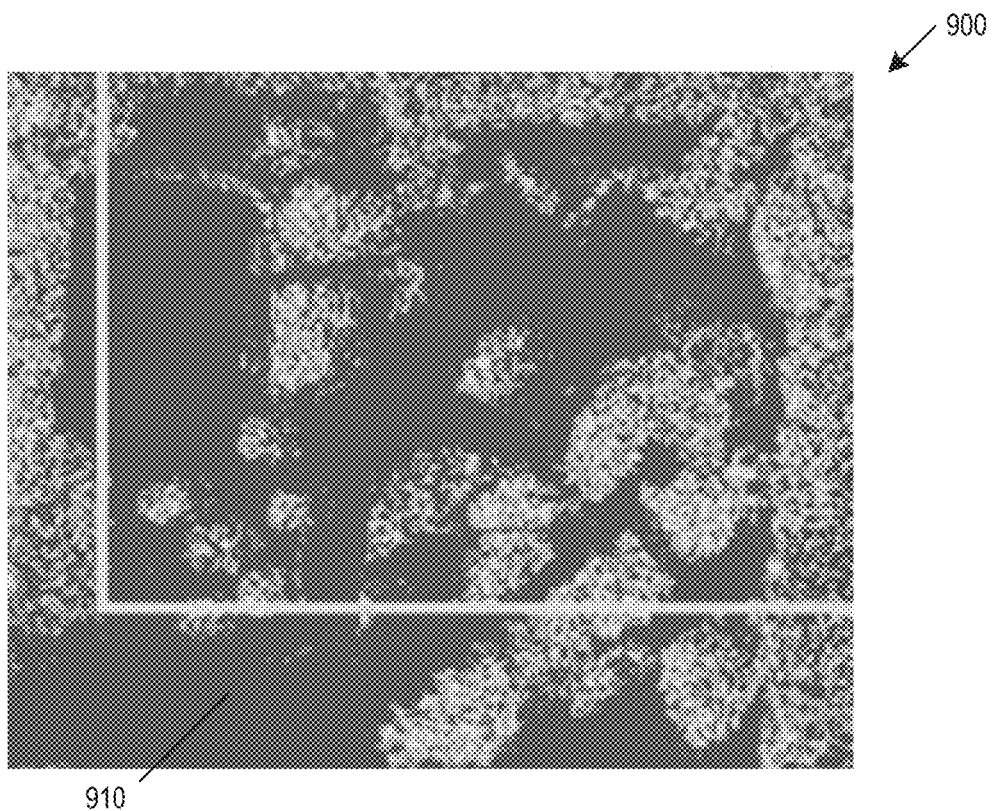
FIGS. 9A-9B are graphs of acre-to-acre increased bin maps 900, in accordance with at least one embodiment.
Figure 9B:
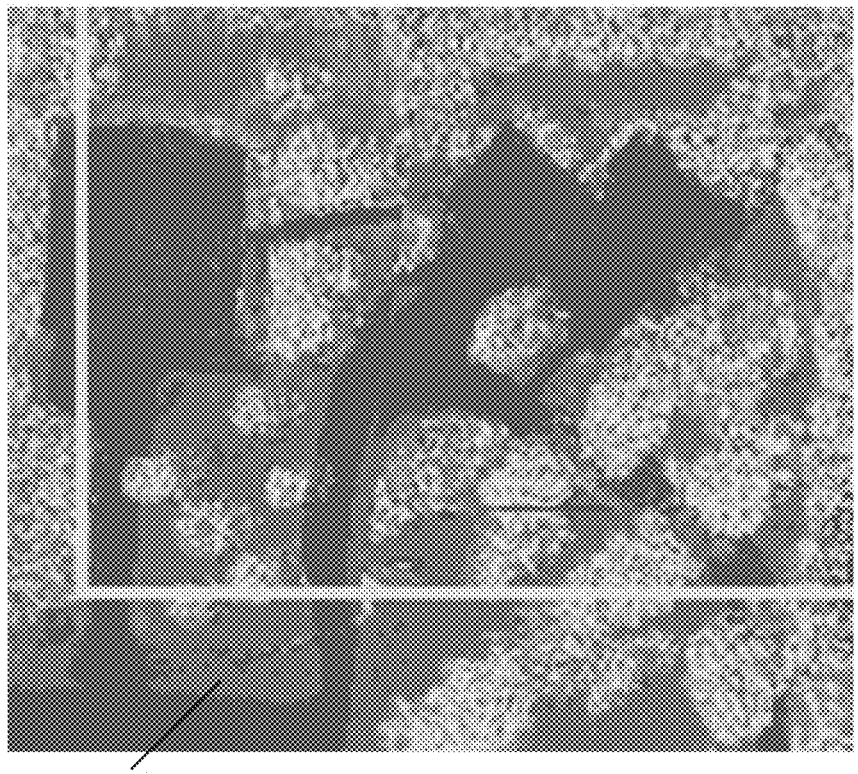

FIGS. 9A-9B are graphs of acre-to-acre increased bin maps 900, in accordance with at least one embodiment. FIG. 9A shows a 5-bin representation, which is visually similar to the 15-bin representation shown in FIG. 9B. However, an area 910 may include many low NDVI values grouped together, such as similar NDVI values between a road and a grass lawn. By using the 15-bin representation shown in FIG. 9B, areas may be separated into different regions, such as separating the grassy lawn 920 from the surrounding road.

Figure 10A:
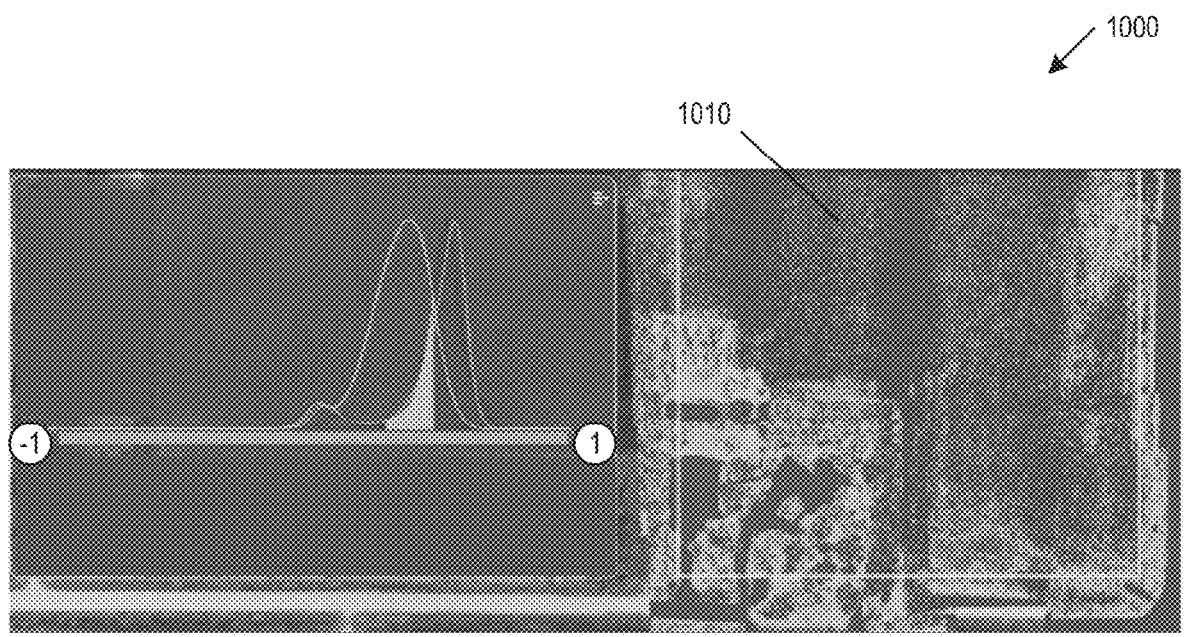
FIGS. 10A-10B are graphs of day-to-day increased bin maps 1000, in accordance with at least one embodiment.
Figure 10B:
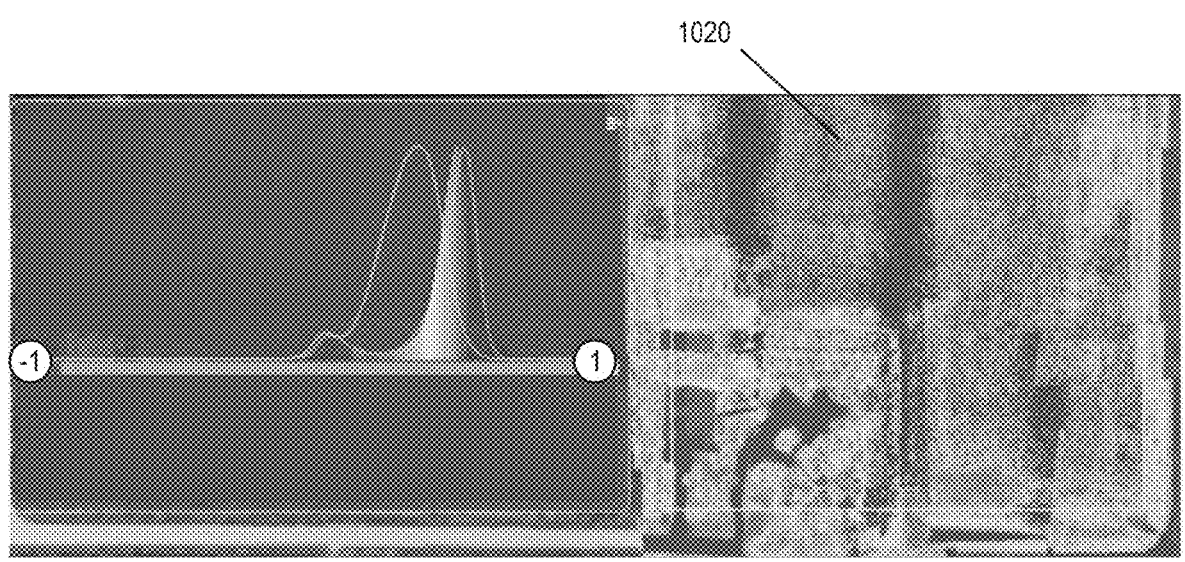

FIGS. 10A-10B are graphs of day-to-day increased bin maps 1000, in accordance with at least one embodiment. In day-to-day mode, increasing the number of bins can provide significant additional visible differences. FIG. 10A includes a 5-bin analysis of a field, where field region 1010 shows some differences from the surrounding field. In contrast. FIG. 10B includes a 15-bin analysis of the same field, where field region 1020 shows significant differences from the surrounding field. Increasing the number of bins to 15 emphasizes variation within the field, while maintaining consistent coloring between flights done on different days.

Figure 11:
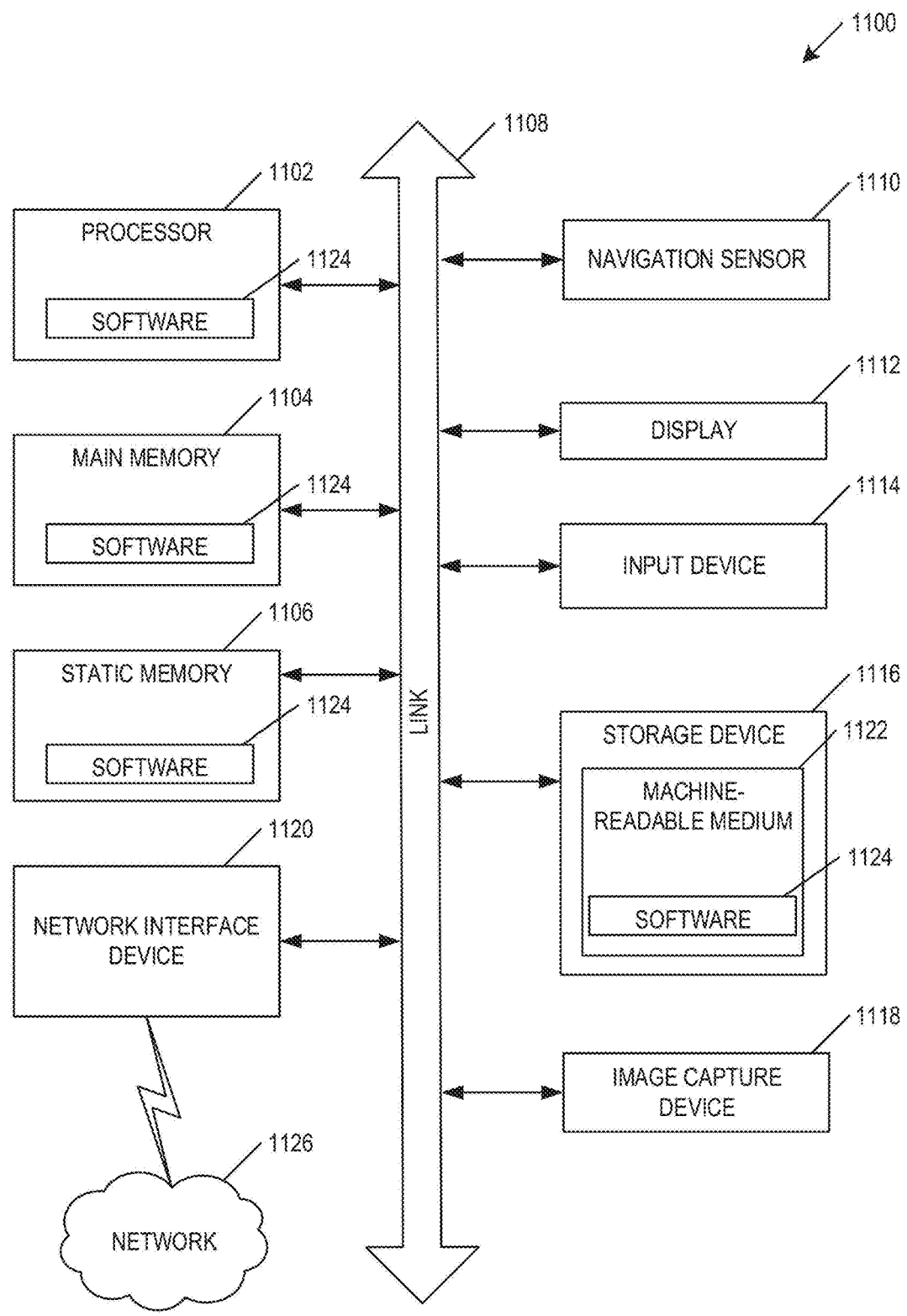
FIG. 11 is a block diagram illustrating an index-based analysis system in an example form of an electronic device 1100, according to an example embodiment.

FIG. 11 is a block diagram illustrating an index-based analysis system in an example form of an electronic device 1100, within which a set or sequence of instructions may be executed to cause the machine to perform any one of the methodologies discussed herein, according to an example embodiment. Electronic device 1100 may represent an index survey vehicle, or may represent an electronic device on which the index analysis occurs. In alternative embodiments, the electronic device 1100 operates as a standalone device or may be connected (e.g., networked) to other machines. In a networked deployment, the electronic device 1100 may operate in the capacity of either a server or a client machine in server-client network environments, or it may act as a peer machine in peer-to-peer (or distributed) network environments. The electronic device 1100 may be implemented on a System-on-a-Chip (SoC), a System-in-a-Package (SiP), an integrated circuit (IC), a portable electronic device, a personal computer (PC), a tablet PC, a hybrid tablet, a personal digital assistant (PDA), a mobile telephone, a server computer, or any electronic device 1100 capable of executing instructions (sequential or otherwise) that specify actions to be taken by that machine to detect a user input. Further, while only a single electronic device 1100 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 1100 includes at least one processor 1102 (e.g., a central processing unit (CPU), a graphics processing unit (GPU) or both, processor cores, compute nodes, etc.), a main memory 1104 and a static memory 1106, which communicate with each other via a link 1108 (e.g., bus). The main memory 1104 or static memory 1106 may be used to store navigation data (e.g., predetermined way points) or payload data (e.g., stored captured images).

The electronic device 11X) includes a navigation sensor 1110, which may provide a geographic reference (i.e., georeference) for captured imagery. Navigation sensor 1110 may include an IMU, which may include an accelerometer and gyroscope to output vehicle roll, pitch, yaw, acceleration, or other inertial data. The navigation sensor 1110 may include a compass to provide heading, or may include a GNSS to provide location. The navigation sensor 1110 may include a tightly coupled IMU and GNSS system.

The electronic device 11X) may further include a display unit 1112, where the display unit 1112 may include a single component that provides a user-readable display and a protective layer, or another display type. The electronic device 1100 may further include an input device 1114, such as a pushbutton, a keyboard, or a user interface (UI) navigation device (e.g., a mouse or touch-sensitive input). The electronic device 1100 may additionally include a storage device 1116, such as a drive unit. The electronic device 1100 may additionally include an image capture device 1118 to provide to capture one or more images for processing as described above. The electronic device 1100 may additionally include a network interface device 1120, and one or more additional sensors (not shown).

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, or within the processor 1102 during execution thereof by the electronic device 1100. The main memory 1104, static memory 1106, and the processor 1102 may also constitute machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here.

Example 1 is a geospatial index synthesis system comprising: one or more processors; a storage device comprising instructions, which when executed by the one or more processors, configure the one or more processors to: receive a plurality of geospatial index data sets generated by one or more geospatial remote sensing systems, each geospatial index data set including a plurality of index bins, each index bin corresponding to a geospatial area within each index data set; and generate an aggregated histogram based on the plurality of geospatial index data sets; and a memory to store the aggregated histogram.

In Example 2, the subject matter of Example 1 optionally includes the instructions further configuring the one or more processors to: receive a selection of a first index data set; and generate a visual representation of the first index data set based on the aggregated histogram.

In Example 3, the subject matter of Example 2 optionally includes the instructions further configuring the one or more processors to display the visual representation on a display device.

In Example 4, the subject matter of any one or more of Examples 2-3 optionally include the instructions further configuring the one or more processors to identify a plurality of data set visual bins based on a comparison between the first index data set and the aggregated histogram, wherein the generation of the visual representation of the first index data set includes generating a first index data set representation based on the plurality of data set visual bins.

In Example 5, the subject matter of Example 4 optionally includes wherein identification of the plurality of data set visual bins includes selecting a visual bin color for each of the plurality of data set visual bins.

In Example 6, the subject matter of any one or more of Examples 2-5 optionally include the instructions further configuring the one or more processors to generate a first index data histogram based on the first index data set, wherein the generation of the visual representation of the first index data set includes generating a first index histogram representation based on the first index data histogram.

In Example 7, the subject matter of any one or more of Examples 2-6 optionally include the instructions further configuring the one or more processors to: receive a selection of a second index data set; and generate a second index data histogram based on the second index data set: wherein the generation of the visual representation of the first index data set includes generating a second index histogram representation based on the second index data histogram.

In Example 8, the subject matter of any one or more of Examples 2-7 optionally include wherein the generation of the second index histogram representation includes generating a contour line corresponding to the second index data histogram.

In Example 9, the subject matter of any one or more of Examples 1-8 optionally include wherein each geospatial data set within the plurality of geospatial index data sets includes a geospatial image from the one or more geospatial remote sensing systems.

In Example 10, the subject matter of any one or more of Examples 1-9 optionally include wherein each geospatial image includes a georeferenced mosaic image, each mosaic image generated based on a plurality of stitching images captured by the one or more geospatial remote sensing systems.

In Example 11, the subject matter of any one or more of Examples 9-10 optionally include wherein each index bin corresponds to a pixel within each of the plurality of geospatial images.

In Example 12, the subject matter of any one or more of Examples 1-11 optionally include the instructions further configuring the one or more processors to: generate a plurality of individual histograms, each of the plurality of individual histograms including a summed number of pixels of each index bin within each of the plurality of geospatial index data sets: generate a per data set percentage of pixels for each index bin by dividing a total number of pixels for each index bin by a total number of pixels for all index values; and generate an averaged pixel-based data set by averaging a percentage of pixels of each index bin across each data set, the averaged pixel-based data set indicating a percentage of pixels for each index bin: wherein the generation of the aggregated histogram is further based on the pixel-based data set and on the per-data set percentage of pixels.

In Example 13, the subject matter of any one or more of Examples 1-12 optionally include the instructions further configuring the one or more processors to: generate a per data set summation of pixels for each index data set by summing a total number of pixels of each index bin; and generate a summed pixel-based data set by summing the total number of pixels of each index bin across each data set: wherein the generation of the aggregated histogram is further based on the summed pixel-based data set.

Example 14 is a geospatial index synthesis method comprising: receiving a plurality of geospatial index data sets generated by one or more geospatial remote sensing systems, each geospatial index data set including a plurality of index bins, each index bin corresponding to a geospatial area within each index data set; generating an aggregated histogram based on the plurality of geospatial index data sets; and storing the aggregated histogram in a memory.

In Example 15, the subject matter of Example 14 optionally includes receiving a selection of a first index data set; and generating a visual representation of the first index data set based on the aggregated histogram.

In Example 16, the subject matter of Example 15 optionally includes displaying the visual representation on a display device.

In Example 17, the subject matter of any one or more of Examples 15-16 optionally include identifying a plurality of data set visual bins based on a comparison between the first index data set and the aggregated histogram, wherein the generation of the visual representation of the first index data set includes generating a first index data set representation based on the plurality of data set visual bins.

In Example 18, the subject matter of Example 17 optionally includes wherein identification of the plurality of data set visual bins includes selecting a visual bin color for each of the plurality of data set visual bins.

In Example 19, the subject matter of any one or more of Examples 15-18 optionally include generating a first index data histogram based on the first index data set, wherein the generation of the visual representation of the first index data set includes generating a first index histogram representation based on the first index data histogram.

In Example 20, the subject matter of any one or more of Examples 15-19 optionally include receiving a selection of a second index data set; and generating a second index data histogram based on the second index data set: wherein the generation of the visual representation of the first index data set includes generating a second index histogram representation based on the second index data histogram.

In Example 21, the subject matter of any one or more of Examples 15-20 optionally include wherein the generation of the second index histogram representation includes generating a contour line corresponding to the second index data histogram.

1 In Example 22, the subject matter of any one or more of Examples 14-21 optionally include wherein each geospatial data set within the plurality of geospatial index data sets includes a geospatial image from the one or more geospatial remote sensing systems.

In Example 23, the subject matter of Example 22 optionally includes wherein each geospatial image includes a georeferenced mosaic image, each mosaic image generated based on a plurality of stitching images captured by the one or more geospatial remote sensing systems.

In Example 24, the subject matter of any one or more of Examples 22-23 optionally include wherein each index bin corresponds to a pixel within each of the plurality of geospatial images.

In Example 25, the subject matter of any one or more of Examples 14-24 optionally include generating a plurality of individual histograms, each of the plurality of individual histograms including a summed number of pixels of each index bin within each of the plurality of geospatial index data sets; generating a per data set percentage of pixels for each index bin by dividing a total number of pixels for each index bin by a total number of pixels for all index values; and generating an averaged pixel-based data set by averaging a percentage of pixels of each index bin across each data set, the averaged pixel-based data set indicating a percentage of pixels for each index bin; wherein the generation of the aggregated histogram is further based on the pixel-based data set and on the per-data set percentage of pixels.

In Example 26, the subject matter of any one or more of Examples 14-25 optionally include generating a per data set summation of pixels for each index data set by summing a total number of pixels of each index bin; and generating a summed pixel-based data set by summing the total number of pixels of each index bin across each data set; wherein the generation of the aggregated histogram is further based on the summed pixel-based data set.

Example 27 is at least one machine-readable medium including instructions, which when executed by a computing system, cause the computing system to perform any of the methods of Examples 14-26.

Example 28 is an apparatus comprising means for performing any of the methods of Examples 14-26.

Example 29 is at least one non-transitory machine-readable storage medium, comprising a plurality of instructions that, responsive to being executed with processor circuitry of a computer-controlled device, cause the computer-controlled device to: receive a plurality of geospatial index data sets generated by one or more geospatial remote sensing systems, each geospatial index data set including a plurality of index bins, each index bin corresponding to a geospatial area within each index data set; generate an aggregated histogram based on the plurality of geospatial index data sets; and store the aggregated histogram.

In Example 30, the subject matter of Example 29 optionally includes the instructions further causing the computer-controlled device to: receive a selection of a first index data set; and generate a visual representation of the first index data set based on the aggregated histogram.

In Example 31, the subject matter of Example 30 optionally includes the instructions further causing the computer-controlled device to display the visual representation on a display device.

In Example 32, the subject matter of any one or more of Examples 30-31 optionally include the instructions further causing the computer-controlled device to identify a plurality of data set visual bins based on a comparison between the first index data set and the aggregated histogram, wherein the generation of the visual representation of the first index data set includes generating a first index data set representation based on the plurality of data set visual bins.

In Example 33, the subject matter of Example 32 optionally includes wherein identification of the plurality of data set visual bins includes selecting a visual bin color for each of the plurality of data set visual bins.

In Example 34, the subject matter of any one or more of Examples 30-33 optionally include the instructions further causing the computer-controlled device to generate a first index data histogram based on the first index data set, wherein the generation of the visual representation of the first index data set includes generating a first index histogram representation based on the first index data histogram.

In Example 35, the subject matter of any one or more of Examples 30-34 optionally include the instructions further causing the computer-controlled device to: receive a selection of a second index data set; and generate a second index data histogram based on the second index data set: wherein the generation of the visual representation of the first index data set includes generating a second index histogram representation based on the second index data histogram.

In Example 36, the subject matter of any one or more of Examples 30-35 optionally include wherein the generation of the second index histogram representation includes generating a contour line corresponding to the second index data histogram.

In Example 37, the subject matter of any one or more of Examples 29-36 optionally include wherein each geospatial data set within the plurality of geospatial index data sets includes a geospatial image from the one or more geospatial remote sensing systems.

In Example 38, the subject matter of any one or more of Examples 29-37 optionally include wherein each geospatial image includes a georeferenced mosaic image, each mosaic image generated based on a plurality of stitching images captured by the one or more geospatial remote sensing systems.

In Example 39, the subject matter of any one or more of Examples 37-38 optionally include wherein each index bin corresponds to a pixel within each of the plurality of geospatial images.

In Example 40, the subject matter of any one or more of Examples 29-39 optionally include the instructions further causing the computer-controlled device to: generate a plurality of individual histograms, each of the plurality of individual histograms including a summed number of pixels of each index bin within each of the plurality of geospatial index data sets; generate a per data set percentage of pixels for each index bin by dividing a total number of pixels for each index bin by a total number of pixels for all index values; and generate an averaged pixel-based data set by averaging a percentage of pixels of each index bin across each data set, the averaged pixel-based data set indicating a percentage of pixels for each index bin; wherein the generation of the aggregated histogram is further based on the pixel-based data set and on the per-data set percentage of pixels.

In Example 41, the subject matter of any one or more of Examples 29-40 optionally include the instructions further causing the computer-controlled device to: generate a per data set summation of pixels for each index data set by summing a total number of pixels of each index bin; and generate a summed pixel-based data set by summing the total number of pixels of each index bin across each data set; wherein the generation of the aggregated histogram is further based on the summed pixel-based data set.

Example 42 is a georeferenced image synthesis apparatus comprising: means for receiving a plurality of geospatial index data sets generated by one or more geospatial remote sensing systems, each geospatial index data set including a plurality of index bins, each index bin corresponding to a geospatial area within each index data set; means for generating an aggregated histogram based on the plurality of geospatial index data sets; and means for storing the aggregated histogram in a memory.

In Example 43, the subject matter of Example 42 optionally includes means for receiving a selection of a first index data set; and means for generating a visual representation of the first index data set based on the aggregated histogram.

In Example 44, the subject matter of Example 43 optionally includes means for displaying the visual representation on a display device.

In Example 45, the subject matter of any one or more of Examples 43-44 optionally include means for identifying a plurality of data set visual bins based on a comparison between the first index data set and the aggregated histogram, wherein the generation of the visual representation of the first index data set includes generating a first index data set representation based on the plurality of data set visual bins.

In Example 46, the subject matter of Example 45 optionally includes wherein identification of the plurality of data set visual bins includes selecting a visual bin color for each of the plurality of data set visual bins.

In Example 47, the subject matter of any one or more of Examples 43-46 optionally include means for generating a first index data histogram based on the first index data set, wherein the generation of the visual representation of the first index data set includes generating a first index histogram representation based on the first index data histogram.

In Example 48, the subject matter of any one or more of Examples 43-47 optionally include means for receiving a selection of a second index data set; and means for generating a second index data histogram based on the second index data set; wherein the generation of the visual representation of the first index data set includes generating a second index histogram representation based on the second index data histogram.

In Example 49, the subject matter of any one or more of Examples 43-48 optionally include wherein the generation of the second index histogram representation includes generating a contour line corresponding to the second index data histogram.

In Example 50, the subject matter of any one or more of Examples 42-49 optionally include wherein each geospatial data set within the plurality of geospatial index data sets includes a geospatial image from the one or more geospatial remote sensing systems.

In Example 51, the subject matter of Example 50 optionally includes wherein each geospatial image includes a georeferenced mosaic image, each mosaic image generated based on a plurality of stitching images captured by the one or more geospatial remote sensing systems.

In Example 52, the subject matter of any one or more of Examples 50-51 optionally include wherein each index bin corresponds to a pixel within each of the plurality of geospatial images.

In Example 53, the subject matter of any one or more of Examples 42-52 optionally include means for generating a plurality of individual histograms, each of the plurality of individual histograms including a summed number of pixels of each index bin within each of the plurality of geospatial index data sets; means for generating a per data set percentage of pixels for each index bin by dividing a total number of pixels for each index bin by a total number of pixels for all index values; and means for generating an averaged pixel-based data set by averaging a percentage of pixels of each index bin across each data set, the averaged pixel-based data set indicating a percentage of pixels for each index bin; wherein the generation of the aggregated histogram is further based on the pixel-based data set and on the per-data set percentage of pixels.

In Example 54, the subject matter of any one or more of Examples 42-53 optionally include means for generating a per data set summation of pixels for each index data set by summing a total number of pixels of each index bin; and means for generating a summed pixel-based data set by summing the total number of pixels of each index bin across each data set; wherein the generation of the aggregated histogram is further based on the summed pixel-based data set.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A precision agriculture remote sensing index synthesis system comprising:
   one or more processors;
   a storage device comprising instructions, which when executed by the one or more processors, configure the one or more processors to:
      receive a plurality of remote sensing index data sets generated by one or more remote sensing systems, the remote sensing index data sets relate to an agricultural field;
      generate an aggregated histogram based on the plurality of remote sensing index data sets;
      receive a selection of a first remote sensing index data set from the plurality of remote sensing index data sets;
      generate a visual representation of the first remote sensing index data set based on the aggregated histogram; and
      display the visual representation on a display device.

2. The system of claim 1, wherein each remote sensing index data set includes a plurality of index bins, each index bin corresponding to a range of index values of the agricultural field within each remote sensing index data set.

3. The system of claim 1, the instructions further configuring the one or more processors to identify a plurality of data set visual bins based on a comparison between the first remote sensing index data set and the aggregated histogram, wherein the generation of the visual representation of the first remote sensing index data set includes generating an index data set representation based on the plurality of data set visual bins.

4. The system of claim 3, wherein identification of the plurality of data set visual bins includes selecting a visual bin color for each of the plurality of data set visual bins.

5. The system of claim 1, the instructions further configuring the one or more processors to generate an index data histogram based on the first remote sensing index data set, wherein the generation of the visual representation of the first remote sensing index data set includes generating an index histogram representation based on the index data histogram.

6. The system of claim 1, the instructions further configuring the one or more processors to:
   receive a selection of a second remote sensing index data set from the plurality of remote sensing index data sets; and
   generate an index data histogram based on the second remote sensing index data set;
   wherein the generation of the visual representation of the first remote sensing index data set includes generating an index histogram representation based on the index data histogram.

7. The system of claim 6, wherein the generation of the index histogram representation includes generating a contour line corresponding to the index data histogram.

8. The system of claim 1, wherein each remote sensing index data set within the plurality of remote sensing index data sets includes an image from the one or more remote sensing systems.

9. The system of claim 1, further comprising a memory that stores the aggregated histogram.

10. A geospatial index synthesis system comprising:
    one or more processors;
    a storage device comprising instructions, which when executed by the one or more processors, configure the one or more processors to:
       receive a plurality of geospatial index data sets generated by one or more geospatial remote sensing systems, each geospatial index data set including a plurality of index bins, each index bin corresponding to a geospatial area within each index data set;
       generate an aggregated histogram based on the plurality of geospatial index data sets;
       generate a plurality of individual histograms, each of the plurality of individual histograms including a summed number of pixels of each index bin within each of the plurality of geospatial index data sets;
       generate a per data set percentage of pixels for each index bin by dividing a total number of pixels for each index bin by a total number of pixels for all index values; and generate an averaged pixel-based data set by averaging a percentage of pixels of each index bin across each data set, the averaged pixel-based data set indicating a percentage of pixels for each index bin;

wherein the generation of the aggregated histogram is further based on the pixel-based data set and on the per-data set percentage of pixels; and a memory to store the aggregated histogram.

11. A geospatial index synthesis system comprising:

one or more processors;

a storage device comprising instructions, which when executed by the one or more processors, configure the one or more processors to:

receive a plurality of geospatial index data sets generated by one or more geospatial remote sensing systems, each geospatial index data set including a plurality of index bins, each index bin corresponding to a geospatial area within each index data set;

generate an aggregated histogram based on the plurality of geospatial index data sets;

generate a per data set summation of pixels for each index data set by summing a total number of pixels of each index bin; and generate a summed pixel-based data set by summing the total number of pixels of each index bin across each data set;

wherein the generation of the aggregated histogram is further based on the summed pixel-based data set; and a memory to store the aggregated histogram.

* * * * *